May 25, 1965
L. W. MERITHEW ETAL
3,185,609
MACHINE FOR CUTTING AND SEALING A WEB
OF THERMOPLASTIC MATERIAL
Filed Feb. 15, 1962
3 Sheets-Sheet 2
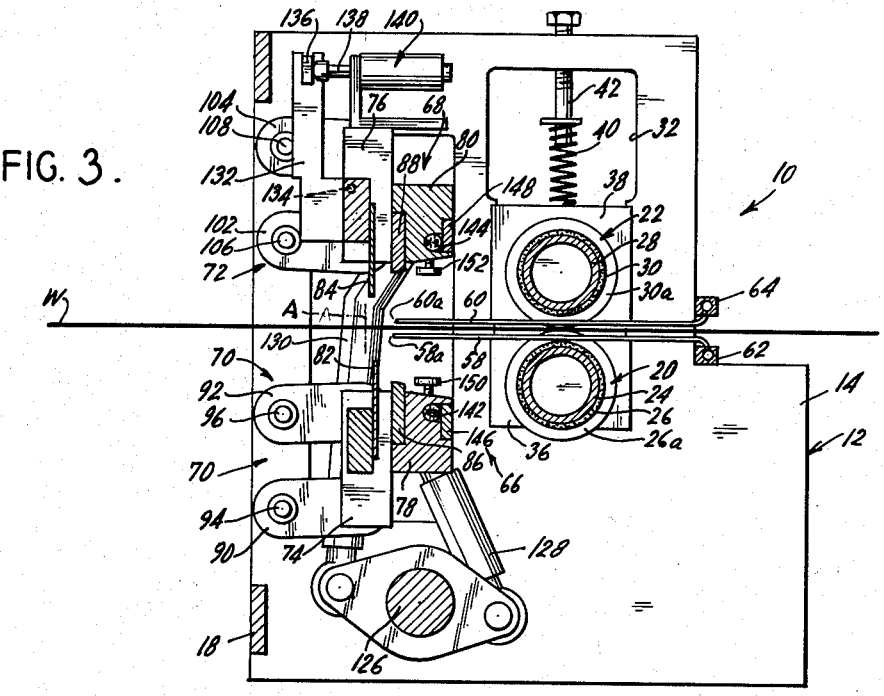
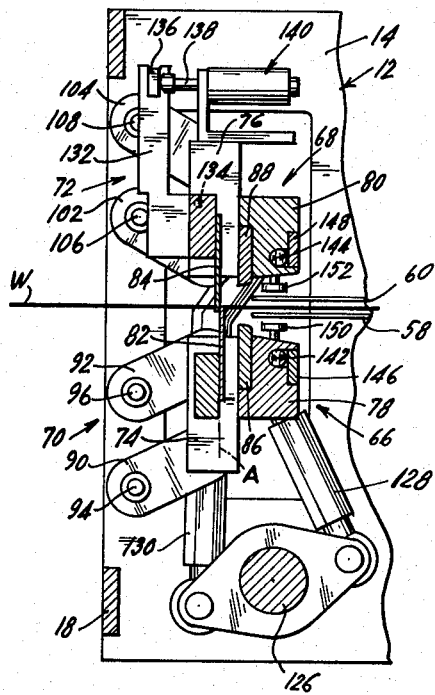
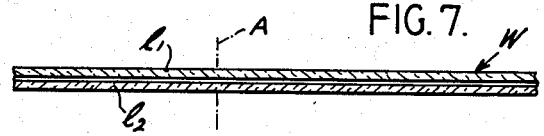
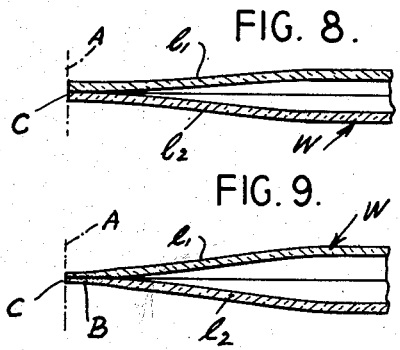
LESTER W. MERITHEW
HERBERT O. CORBETT
INVENTOR.
BY E. J. Berry
ATTORNEYS

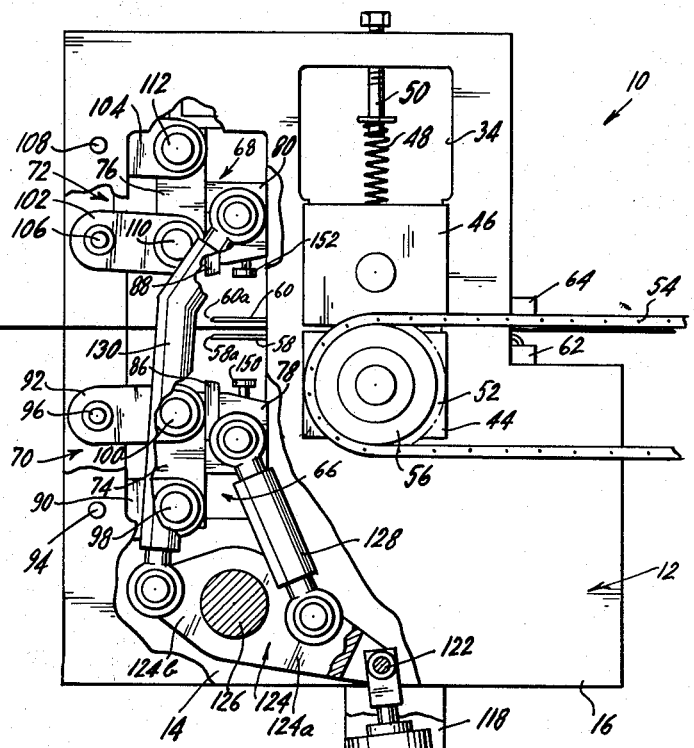

LESTER W. MERITHEW
HERBERT O. CORBETT
INVENTOR.

United States Patent Office 3,185,609
Patented May 25, 1965

3,185,609
MACHINE FOR CUTTING AND SEALING A WEB OF THERMOPLASTIC MATERIAL
Lester W. Merithew, Phelps, and Herbert O. Corbett, Canandaigua, N.Y., assignors to National Distillers and Chemical Corporation, New York, N.Y., a corporation of Virginia
Filed Feb. 15, 1962, Ser. No. 173,458
12 Claims. (Cl. 156—530)

The present invention relates generally to apparatus for cutting and sealing a web of thermoplastic material, and in particular to a machine for forming bags from tubular thermoplastic stock.

Automatic bag-making machinery is available for cutting and sealing successive lengths of tubular thermoplastic stock to form bags. With such machinery, provision is made for advancing successive lengths of the tubular stock through a work station of the machine at which the stock is cut from side to side and formed with the seal along the cut edge to thereby form a bag which is closed at one end by the seal and open at its other end remote from the seal. Sealing is usually accomplished with heated sealing bars which make knife-edge contact with the thermoplastic stock to raise the temperature of the stock in the region of the knife-edge contact to the melting or fusing point. The requisite sealing pressure is established by spring loading the respective heated sealing bars towards each other and into contact with the interposed thermoplastic stock.

Practical experience with this type of machinery indicates that commercial usable seals may be obtained when using relatively thin guage thermoplastic materials having thicknesses in the range of .001 to .003 inch. However, such machinery is not well suited to the manufacture of seals with heavier guage thermoplastic webs, for example, of a thickness of the order of .01 inch. With such heavier guage stock, the use of spring loaded heated sealing bars of the knife-edge type brings about uncontrollable and unpredictable variations in sealing pressure and/or heat conduction to the sealing zone or region. This often results in seals which vary greatly in strength and/or in the production of unsatisfactory seals.

Broadly, it is an object of the present invention to provide improved bag-making machinery which obviates one or more of the aforesaid difficulties. Specifically, it is within the contemplation of the present invention to provide improved machinery for cutting and sealing relatively heavy guage webs of thermoplastic material.

It is a still further object of the present invention to provide a machine for forming bags of tubular thermoplastic stock and which produces a seal between the superposed plies or layers of the tubular stock having a strength equal to or greater than the strength of the individual plies or layers.

In addition to the need for a seal having the requisite physical properties, it is also important that the seal be located contiguous to and coextensive with the cut edge or line across the width of the tubular stock. If the seal does not extend directly to the cut edge, the two plies or layers of the stock will be separated along the cut edge and impart a rough or unfinished appearance to the bag. Particularly when working with heavy guage material, it is not practical to simultaneously cut and seal since it is difficult to bring separate cutting and sealing members or blades into a common cutting and sealing zone or region across the width of the stock. Further, the sealing members or blades should provide a relatively large sealing area and have a substantial mass to provide a corresponding large area seal and to assure sufficient heat conduction to the seal.

It is a further object of the present invention to provide improved bag-making machinery for heavy guage plastics which provides for a bond or a seal which merges into the cut edge of the bag-forming stock thereby providing a cut and sealed edge which has the appearance of a single ply of such stock.

In accordance with an illustrative embodiment demonstrating objects and features of the present invention, there is provided a machine for forming bags from thermoplastic stock which comprises means for intermittently feeding the stock along a feed path to a cutting and sealing location. Opposed cutting blades are disposed on opposite sides of the feed path and are mounted for movement toward each other into a cutting position along the feed path at the cutting and sealing locations for cutting the stock along an edge thereof. Opposed sealing blades are disposed at opposite sides of the feed path and are mounted for movement toward each other and into a sealing position along the feed path substantially at the cutting and sealing location for sealing the stock along an area seal or bond which is contiguous to and coextensive with the cut edge. Provision is made for moving the cutting and sealing blades into the cutting and sealing positions respectively and in succession during intervals between successive advances of the thermoplastic stock such that the stock is first cut and then sealed to form bags therefrom.

As a feature of the invention, the sealing blades have opposed sealing faces which compress the tubular stock when the sealing blades move into sealing position and means are provided for limiting the approach of the sealing faces when in the sealing position to provide a corresponding control over the compression of the tubular stock during sealing. In accordance with this feature, the depth of penetration of the respective sealing blades into the superposed plies or layers of the tubular stock may be accurately controlled such that the overall thickness of the compression molded bond between the two plies or layers may be established to be at least equivalent to the rupture or impact strength of a single thickness or ply of the tubular stock.

The above brief description, as well as further objects, features, and advantages of the present invention will be more fully appreciated by reference to the following detailed description of a presently preferred, but nonetheless illustrative embodiment in accordance with the present invention, when taken in conjunction with the accompanying drawings, wherein:

FIG. 1 is a side elevational view of a bag-forming machine embodying features of the present invention, with parts broken away and sectioned in the interest of clarity, and with the cutting and sealing blades or members shown in their retracted or inoperative position;

FIG. 2 is a side elevational view similar to FIG. 1, but showing the sealing blades or members in their operative or sealing position;

FIG. 3 is a vertical section taken substantially along the lines of 3—3 of FIG. 6, showing the cutting and sealing blades or members in their retracted or inoperative position corresponding to FIG. 1;

FIG. 4 is a fragmentary sectional view similar to FIG. 3, showing the cutting blades or members in cutting or operative position relative to each other and intersecting the plane along which the tubular stock or web is advanced;

FIG. 7 is a longitudinal sectional view through a typical length of thermoplastic tubular stock, shown at the cutoff location designated by the dot-dash line and prior to cutting;

FIG. 8 is a sectional view similar to FIG. 7 showing the tubular stock after cutting and at a time just prior to sealing; and, FIG. 9 is a sectional view similar to FIG. 8, showing the tubular stock formed with compression molded bond in accordance with the present invention.

Figures 5, 6:
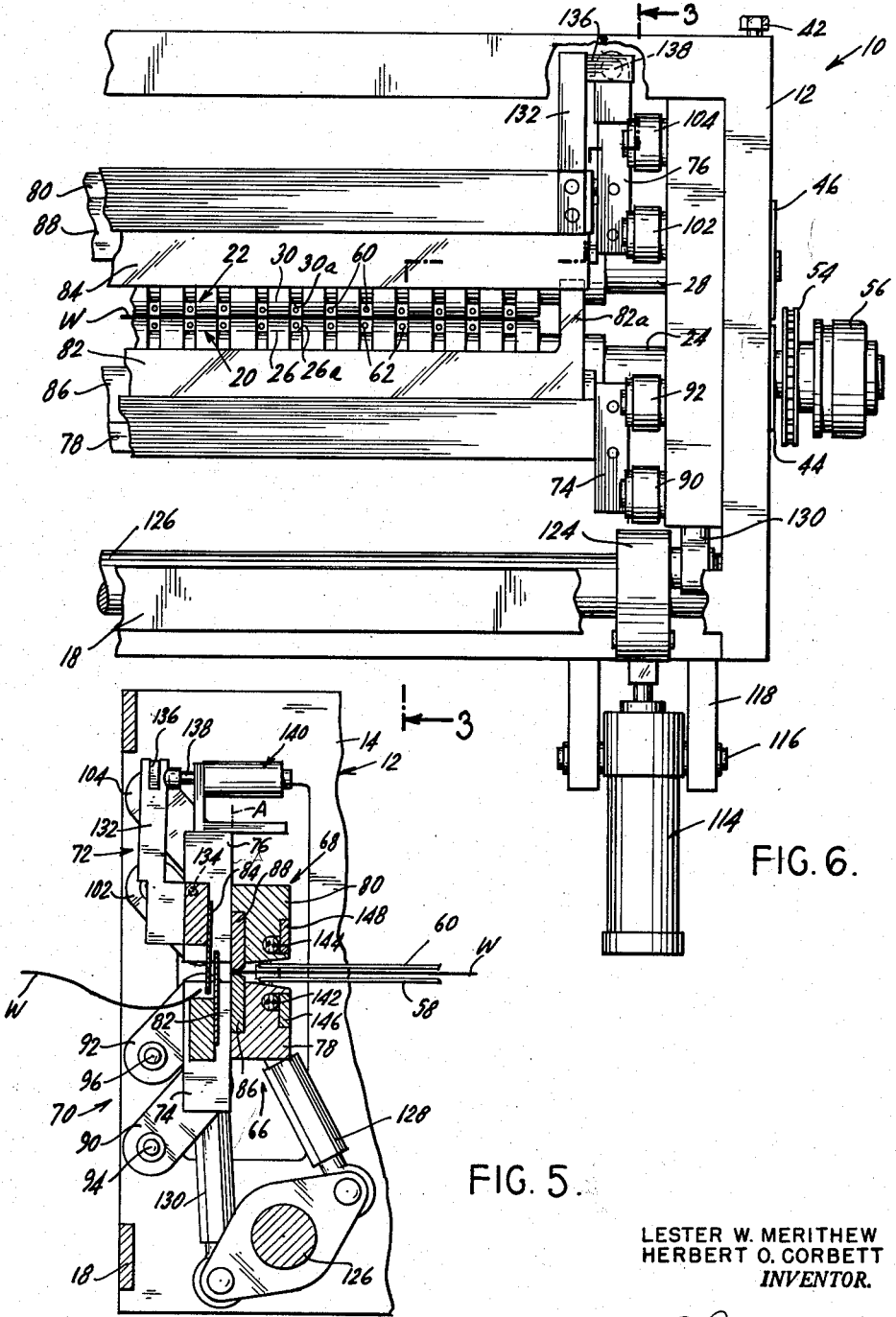
FIG. 5 is a fragmentary vertical section similar to FIG. 4, illustrating a time in the cutting and sealing cycle after the cutting blades or members have severed the stock, with the sealing blades or members in the sealing or operative position corresponding to FIG. 2.
FIG. 6 is an end elevational view of the machine, with parts broken away, taken from the left of FIG. 1 and showing the cutting and sealing blades or members in their retracted or inoperative position.

Referring now specifically to the drawings, there is shown in FIGS. 1 through 6, inclusive, a bag-forming machine in accordance with the present invention, which is generally designated by the reference numeral 10. The bag-forming machine is arranged to cut and seal a web of heat-sealable thermoplastic stock W, such as polyethylene. The bag-forming stock W is shown on a greatly exaggerated scale in FIGS. 7 to 9 inclusive, wherein it is seen that the stock includes superposed plies or layers $l_1$, $l_2$ which are joined along opposite longitudinally-extending edges. The superposed plies or layers $l_1$, $l_2$, are severed at a cut-off location, generally designated by the letter A, to provide a cut edge or line C (see FIG. 8); and thereafter an area compression bond or seal B is formed across the width of the tubular stock W substantially coextensive with and contiguous to the cut edge or line C. As will subsequently be described, the transverse and longitudinal extent of the compression molded bond B can be accurately established by the appropriate dimensioning of the sealing faces of the respective sealing blades or members. Further, the approach of the sealing blades or members to each other may be limited by physical or mechanical stops such that there is a predetermined gap therebetween which will control or limit the depth to which the sealing members penetrate into the two plies or layers $l_1$, $l_2$. Since the overall thickness of the two bonded plies or layers may be adjusted and controlled, the strength of the final compression molded bond or seal B may be established to be at least equivalent to the rupture or impact strength of a single thickness of the base film employed in initially forming the tubular stock W.

Referring now to FIGS. 1 to 6 inclusive, the bag-forming machine 10 is seen to include a support or frame 12 having spaced upstanding side walls 14, 16, interconnected by a number of cross bars 18. Extending transversely of the machine and journaled on the side walls 14, 16 are horizontally extending feeding rollers 20, 22 which are geared together and rotated in unison to intermittently advance or feed the tubular stock W in a horizontal cutting or feeding plane to the cut-off location A. The lower feeding roller 20 includes a cylindrical core or shaft 24 carrying a sleeve or sheath 26 which terminates short of the opposite side walls 14, 16, of the frame or support 12. The sleeve or sheath 26 is formed at spaced locations along its length with a series of circumferential grooves 26a (see FIGS. 3 and 6). The upper feeding roller 22 similarly includes a hollow cylindrical core or shaft 28 which extends from side to side from the machine and carries a sheath or sleeve 30 intermediate the ends thereof formed with a series of longitudinally spaced and circumferentially extending grooves 30a arranged in opposed spaced relation to the grooves 26a in the sheath 26.

The side walls 14, 16, are formed respectively with vertically-extending ways 32, 34, which receive respective bearings for the opposite ends of the cores or shafts 24, 28 of the lower and upper feeding rollers 20, 22. Specifically, and as seen best in FIG. 3, one end of the shaft 24 of the lower feeding roller 20 is journaled in a bearing 36 which is fitted into the vertical way 32, while the adjacent end of the shaft 28 of the upper feed roller 22 is received within a bearing 38 which likewise fitted in the vertical way 32 in superposed and spaced relation to the bearing 36. A biasing spring 40 bears against the upper bearing 38 to urge the periphery of the upper sheath 30 against the periphery of the lower sheath 26. The bias exerted by the spring 40 may be adjusted through the provision of an adjustable spring supporting member 42 which extends vertically through a threaded bore in the side wall 14 and supports the spring 40. In similar fashion, the shafts 24, 28 of the lower and upper feeding rollers 20, 22 are journaled at the opposite side of the machine, as best seen in FIG. 3. Specifically, respective lower and upper bearings 44, 46 receive the adjacent ends of the shafts 24, 28. The bearings 44, 46, are maintained in spaced relation due to the contact of the peripheries of the sheaths or sleeves 26, 30 and are mounted in the vertical way 34. The upper bearing 46 is urged downwardly by a biasing spring 48 which is mounted on an adjustable spring supporting member 50. It will of course be appreciated that the described mounting for the feeding rollers 20, 22 is merely illustrative and typical of the many mounting arrangement which are suitable in this type of machine.

Intermittent movement is imparted to the lower and upper feeding rollers 20, 22 in any convenient fashion. For example, and as seen best in FIGS. 1 and 6, a driven sprocket 52 is secured to the lower feeding roller 20 upwardly of the side wall 16. The driven sprocket 52 is coupled via a chain 54 to a driving sprocket (not shown) which is mounted on the output shaft of a drive unit which may incorporate an electric clutch 56 (see FIG. 6) for selectively imparting drive to the lower feeding roller 20. The lower feeding roller 20 is operatively connected to the upper feeding roller by a pair of meshing gears or in any other convenient fashion. By selectively energizing the electric clutch 56, prescribed lengths of the tubular stock W may be fed by the lower and upper feeding rollers 20, 22, along the cutting and feeding plane and through the cut-off location A. The period of energization of the electric clutch 56 and the corresponding interval of drive to the lower and upper feeding rollers 20, 22 will of course determine the length of successive bags formed from the tubular stock W, as is generally understood.

Since the thermoplastic tubular stock or web 12 is flexible and not self-supporting, provision is made remote from the cut-off location A to maintain successive lengths of the tubular stock W in the cutting and sealing plane. In this illustrative embodiment, and as best seen in FIGS. 3 and 6, there is provided a series of horizontally extending lower and upper air tubes, 58, 60 which are disposed at opposite sides of and parallel to the cutting and sealing plane and arrange to direct air jets under from the direction of the feeding rollers 20, 22, towards the cutting and sealing location A, such as to entrain successive lengths of the tubular stock or web W in the air jets. Specifically, the lower air tubes 58 extend through the circumferential grooves 26a on the lower feeding roller 20 and have their free ends 58a terminating short of but directed toward the cut-off location. Similarly, the upper air tubes 60 extend through the circumferential grooves 30a on the upper feeding roller 22 and have their free ends 60a directed toward and terminating short of the cut-off location A. The ends of the air tubes 58, 60 remote from the free ends 58a, 60a are connected respectively to supply heads 62, 64, which are in turn connected to an appropriate source of air under pressure. The parallel air streams provided by the air tubes 58, 60 at opposite sides of and parallel to the desired cutting and sealing plane appropriately orient the web in the cutting and sealing location A for the successive bag-forming operations, as will be described.

Cutting and sealing mechanisms are operative at the cut-off location A in succession to cut the web W along the cut line C and to seal the web in a sealing zone B bounded at one side by the cut line C. The cutting and sealing mechanisms include opposed work heads 66, 68 respectively mounted on parallelogram linkages 70, 72 for movement toward and away from the web W in the cutting and sealing plane. The work heads 66, 68 each include a head bar 74, 76 (serving respectively as movable links of the parallelogram linkages 70, 72) and head blocks 78, 80.

Mounted on the head bars 74, 76, are opposed cutting blades 82, 84 which are movable into a cutting position in the plane of the web W and at the cutting and sealing location A (see FIG. 4) in response to a first portion of the movement of the work heads 66, 68 toward each other. Further, the work heads 66, 68 carry opposed sealing blades or members 86, 88 which are movable into a sealing position in the plane of the web W and at the cutting and sealing location A in response to a further portion of the movement of the work heads 66, 68 toward each other (see FIG. 5).

The respective parallelogram mounting linkages 70, 72 provide first motion components for advancing the cutting blades 82, 84 toward each other and into the cutting position intersecting the web W and second motion components for displacing the cutting blades laterally and toward the cut-off location A, as may be appreciated by progressively inspecting FIGS. 3 and 4. Further, the parallelogram mounting linkages 70, 72 mount the sealing blades 86, 88, which are offset from the cut-off location A and from the cutting blades 82, 84 in the direction of the feeding rollers 20, 22, for movement relative to each other in trailing relation to the cutting blades 82, 84 and into a sealing position at opposite sides of and contiguous to the plane of the web W at the cut-off location A. The sealing blades 86, 88 likewise are provided with first motion components for advancing the sealing blades toward each other and second motion components for displacing the sealing blades laterally and toward the cut-off location A at a time after the cutting blades, 82, 84, have passed through the web W, as may be appreciated by progressively inspecting FIGS. 4 and 5. Specifically, the parallelogram mounting linkage 70 includes mounting links 90, 92 which are in spaced parallel relation. The mounting links 90, 92 are pivotally mounted on the frame or support 12 at a first pair of pivotal mounts 94, 96 and are pivotally connected to the head bar 74 of the work head 66 at a first pair of pivotal connections 98, 100. This provides the first parallelogram mounting linkage 70 wherein the support 12 intermediate the pivotal mounts 94, 96 serves as a first stationary link, the head bar 74 intermediate the pivotal connections 98, 100 serves as a first movable link, and the mounting links 90, 92 serve as second and third movable links. This parallelogram mounting linkage will be recognized as providing successive vertical positions for the cutting blade 82 and the sealing blade 86 which are progressively translated toward the cutting and sealing plane and the cut-off location A as the mounting links 90, 92 turn in the counterclockwise direction about their respective pivotal mounts 94, 96.

Similarly, the parallelogram mounting linkage 72 includes a pair of mounting links 102, 104 which are in spaced parallel relation and are pivotally mounted on the frame or support 12 at a first pair of spaced pivotal mounts 106, 108. The mounting links 102, 104 are pivotally connected to the head bar 76 at spaced pivotal connections 110, 112 such that the portion of the support intermediate the pivotal mounts 106, 108 serve as a stationary link for the parallelogram mounting linkage. The head bar 76 intermediate the pivotal connection 110, 112 serves as a movable link of this linkage, with two further movable links being provided by the mounting links 102, 104. The parallelogram mounting linkage 72 mounts the cutting blade 84 and the sealing blade 88 for movement into successive vertical positions toward the cutting and sealing plane and laterally displaced toward the cutting location A in response to clockwise turning movement of the mounting links 102, 104 about the pivotal mounts 106, 108. It will be appreciated of course that the geometry of the respective parallelogram mounting linkages 70, 72 is such that the vertically extending cutting faces of the cutting blades 82, 84 will make a rubbing or wiping contact with each other when the cutting blades move into the cutting position shown in FIG. 4. At this time, the sealing blades 86, 88 are spaced from each other and laterally offset from the cut-off location A in the direction of the feeding rollers 20, 22. As the movement of the parallelogram linkages continues, the cutting blades 82, 84 move into overlapping relation and respectively project across the cutting and sealing plane at progressive positions laterally offset outwardly of the cut-off location A. Concurrently, the sealing blades 86, 88 move vertically toward each other and laterally into the sealing position at the cut-off location A after the cutting blades have cleared such cut-off location.

Actuating mechanisms are operatively connected to the first and second parallelogram mounting linkages 70, 72 for moving the heads 66, 68 toward and away from each other in unison and in timed relation to the intermittent advance of the tubular stock W under control of the feeding rollers 20, 22. In this illustrative embodiment, the actuating mechanisms include a double-acting piston and cylinder 114 (see FIG. 1) which is pivotally mounted on a horizontal pivot 116 fixed to a depending bracket 118 on the machine frame 12. The piston and cylinder 114 is connected to a source of air under pressure through an appropriate three-way valve which is selectively ported in the intervals between successive advances of the tubular stock W under control of the intermittently driven feed rollers 20, 22. The piston rod 120 of the piston and cylinder 114 is pivotally connected at 122 to a double-armed actuating lever 124 which is pivotally mounted intermediate its ends at 126 on the machine frame or support 12. The arm 124a of the actuating lever 124 is coupled to the head block 78 of the lower work head 66 via a coupling link 128. In similar fashion, the arm 124b of the actuating lever 124 is pivotally connected to the head block 80 of the upper work head 68 via a coupling link 130.

Provision is made for guiding the cutting blades 82, 84 into vertical wiping or rubbing contact with each other as the cutting blades moves into the cutting position (FIG. 4) and for moving the cutting blades out of wiping contact with each other after cutting of the tubular stock W. In this illustrative embodiment, the lower cutting blade or member 82 is provided with upstanding projections or arms 82a at the opposite ends thereof (see FIG. 6) which are of a vertical extent to engage the upper cutting blade or member 84 in the inoperative or retracted position of the cutting blades, as shown in FIGS. 3 and 6. The upstanding arms or projections 82a are contoured to guide the cutting blades 82, 84 into wiping contact with each other as they intersect the cutting and sealing plane at the cut-off location A. In order to hold the cutting blades or members in rubbing or wiping contact with each other during at least the cutting of the tubular stock or web W, the cutting blade 82 is rockably supported on a rocker arm 132 which has a pivotal mount 134 on the head bar 76 of the upper work head 68. Contiguous to its upper end, the rocker arm 132 carries an abutment 136 which is engaged by the piston rod 138 of a piston and cylinder 140 which is connected to an appropriate source of air under pressure which may be selectively ported in timed relation to the movement of the cutting blades 82, 84 through the cutting cycle. At the start of the cutting cycle, and until the vertical cutting faces of the cutting blades 82, 84 cut through the web W, pressure is exerted on the rocker arm 132 which tends to urge the cutting blade 84 in the counterclockwise direction about the pivotal mount 132 and in a direction to make wiping contact with the cutting blade 82. After cut-off is completed, the pressure is released on the piston and cylinder 140 and any convenient mechanical arrangement may be provided for moving the cutting blade 84 in the clockwise direction about the pivotal mount 134 into a clearance position relative to the cutting blade 82. The pressure in the cylinder and piston 140 may be cut off during the noncutting period in the cutting cycle and this prevents the rubbing or wiping contact of the cutting faces during such non-cutting period. The rubbing contact of the cutting blades 82, 84 during the cutting or severing of the web W tends to continuously regenerate the cutting surfaces or edges of the respective cutting blades.

Provision is made for imparting a controlled amount of heat to the sealing blades 86, 88 by the mounting in the respective head blocks 78, 80 of the work heads 66, 68 of heating elements 142, 144 which are removably supported behind respective mounting plates 146, 148. The heat-producing capacity of the respective heating elements 142, 144 is established in relation to the bulk and heat conductivity of the respective head blocks 78, 80 and the size of the contact areas or faces of the respective sealing blades 86, 88 to provide sufficient heat at the sealing zone B of the web W to effect a satisfactory compression bond of the superposed plies or layers $l_1$, $l_2$ of the web W.

Provision is made for limting the approach of the confronting horizontal sealing faces of the sealing blades 86, 88 in relation to each other to provide a corresponding control over the compression of the tubular stock W during sealing which ultimately establishes the thickness of the bond B. In this illustrative embodiment, the confronting surfaces of the head blocks 78, 80 are provided with adjustable mechanical stops 150, 152 which are disposed in spaced relation to the sealing blades 86, 88 in the direction of the feeding rollers 20, 22 and outwardly of the lateral extent of the web W. The mechanical stops 150, 152 are vertically adjustable, as by being supported in threaded relation on the respective head blocks 78, 80 with appropriate lock nut arrangements or the like, such that the confronting contact faces thereof may be oriented in relation to the sealing faces of the blades 86, 88 to limit the approach of the sealing blades toward each other. By this means, it is possible to limit the peneration of the respective sealing faces into the web W of material and thereby control the thickness of the compression molded bond B formed in accordance with the present invention.

In order to facilitate a more thorough understanding of the present invention, a description of a typical sequence of operations now follows:

By progressive reference to FIGS. 3 to 5 inclusive, it is possible to observe a typical cutting and sealing cycle in accordance with the present invention. As seen in FIG. 3, a length of the tubular thermoplastic stock W has been advanced by the feeding rollers 20, 22 through the cut-off location A and is entrained substantially in the horizontal cutting and feeding plane by the action of the air jets produced by the superposed sets of air tubes 58, 60. During this initial period of the cutting and sealing cycle and at a time in advance of the movement of the cutting blades 82, 84 into the cutting position illustrated in FIG. 4, the piston and cylinder 140 is activated to urge the cutting blade 84 into wiping or rubbing contact with the cutting blade 82. The cutting and sealing cycle is initiated during the dwell period of the feeding rollers 20, 22 by the appropriate porting of the actuating piston and cylinder 114 which imparts an upward thrust or push to the lower work head 66 via the coupling link 128 and a downward thrust or pull to the upper work head 68 via the coupling link 130. As the heads 66, 68 move towards each other, the cutting blades 82, 84 approach each other in successive vertical portions and concurrently are laterally displaced towards the cut-off location A. The cutting blades ultimately arrive at the cutting or operative position shown in FIG. 4 wherein they cut through or sever the tubular stock W along the cut line C. At this time in the cycle, the sealing blades 86, 88 are spaced from each other at opposite sides of the cutting and feeding plane occupied by the web W and are laterally offset in the direction of feeding rollers 20, 22 from the cut-off location A. During the next portion of the cutting and sealing cycle, the cutting blades 82, 84 move into overlapping relation extending in opposite directions across the cutting and sealing plane and are progressively displaced laterally outwardly (i.e. to the left in the various figures) to a clearance position in relation to a cut-off location A. At the end of the forward or work stroke of the heads 66, 68, the sealing blades or members 86, 88 come into pressure engagement with the interposed plies of the tubular stock W. A predetermined gap is established between the sealing or contact faces of the sealing blades 86, 88 in accordance with the setting of the mechanical stops 150, 152. It will be appreciated that the stroke of the actuating piston of the cylinder 114 is established to bring the mechanical stops 150, 152 into contact with each other and after a dwell time during which sealing occurs, the piston and cylinder are ported to initiate the return stroke and the corresponding movement of the work heads 66, 68 into the retracted or clearance position relative to each other for the indexing of the next length of the web W into position for the next cutting and sealing cycle.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What we claim is:

1. A machine for forming bags from tubular thermoplastic stock comprising means for intermittently feeding said stock along a feed path to a cutting and sealing location, opposed transverse cutting blades located above and below said feed path, said cutting blades being positioned in a vertical plane offset to one side of said cutting and sealing location, means mounting said cutting blades for movement simultaneously toward each other and longitudinally of said feed path into cutting position at said cutting and sealing location for cutting said stock along an edge thereof and then moving said blades longitudinally in the same direction away from said cut edge, opposed transverse sealing blades located above and below said feed path, said sealing blades being positioned in a vertical plane offset from that of said cutting blades, means mounting said sealing blades for movement toward each other and longitudinally of said feed path into sealing position at said cutting and sealing location for sealing said stock along a transverse area contiguous to and coextensive with said cut edge, and means operable in timed relation to said feeding means for moving said cutting blades and said sealing blades in succession for first cutting and then sealing said stock.

2. In a machine for cutting and sealing a web of thermoplastic material, a support, feeding means for advancing successive lengths of said web in a feed plane to a cutting and sealing location, and spaced cutting and sealing mechanisms positioned in longitudinally spaced relationship in vertical planes offset to one side of said cutting and sealing location and operative in succession to cut said web along a cutting line and to seal said web in a sealing zone bounded at one side by said cutting line, said cutting and sealing mechanisms including opposed heads, parallelogram linkages respectively mounting said heads for movement toward and away from said feed plane, respective cutting blades on said heads movable into a cutting position in said feed plane at said cutting and sealing locations to cut said web along said cutting line in response to a first portion of the movement of said heads toward each other, and respective sealing blades on said heads movable into a sealing position at said cutting and sealing location in response to a further portion of the movement of said heads toward each other, said sealing blades being spaced in relation to each other and mounted on said heads such as to move into said sealing position to form said sealing zone after said web has been cut and said cutting blades have moved to a clearance position spaced outwardly of said cutting line.

3. A machine for cutting and sealing a web of thermoplastic material comprising a support, feeding means for intermittently advancing successive lengths of said web in a feed plane to a cutting and sealing location, spaced cutting and sealing mechanisms positioned in longitudinally spaced relationship in vertical planes offset to one side of said cutting and sealing location and operative in succession to cut said web along a cutting line and to seal said web in a sealing zone bounded at one side by said cutting line, said cutting and sealing mechanisms including opposed heads, parallelogram linkages respectively mounting said heads for movement toward and away from said feed plane, respective cutting blades on said heads movable into a cutting position in said feed plane at said cutting and sealing location to cut said web along said cutting line in response to a first portion of the movement of said heads toward each other, respective sealing blades on said heads movable into a sealing position at said cutting and sealing location in response to a further portion of the movement of said heads toward each other, said sealing blades being spaced in relation to each other and mounted on said heads such as to move into said sealing position to form said sealing zone after said web has been cut and said cutting blades have moved to a clearance position spaced outwardly of said cutting line, and means for moving said heads in timed relation to the intermittent advance of said web.

4. A machine for cutting and sealing a web of thermoplastic material comprising a support, feeding means for intermittently advancing successive lengths of said web in a feed plane to a cutting and sealing location, means removed from said location for maintaining said successive lengths in said feeding plane, spaced cutting and sealing mechanisms positioned in longitudinally spaced relationship in vertical planes offset to one side of said cutting and sealing location and operative in succession to cut said web along a cutting line and to seal said web in a sealing zone bounded at one side by said cutting line, said cutting and sealing mechanisms including opposed heads, parallelogram linkages respectively mounting said heads for movement toward and away from said feed plane, respective cutting blades on said heads movable into a cutting position in said feed plane at said cutting and sealing locations to cut said web along said cutting line in response to a first portion of the movement of said heads toward each other, respective sealing blades on said heads movable into a sealing position at said cutting and sealing location in response to a further portion of the movement of said heads toward each other, said sealing blades being spaced in relation to each other and mounted on said heads such as to move into said sealing position to form said sealing zone after said web has been cut and said cutting blades have moved to a clearance position spaced outwardly of said cutting line, and means for moving said heads in timed relation to the intermittent advance of said web.

5. A machine according to claim 4 wherein the means which maintains successive lengths in said feeding plane includes a series of air tubes disposed at opposite sides of and parallel to said feeding plane and arranged to direct air jets under pressure from the direction of said feeding means toward said cutting and sealing location to entrain said successive lengths in said air jets.

6. A machine for forming bags from thermoplastic stock comprising a support, a stock feeder for advancing successive lengths of said stock in a cutting and sealing plan toward a cut-off location, cutting blades disposed in an inoperative position at opposite sides of and spaced from said plane and laterally offset from said cut-off location in the direction of said stock feeder, means mounting said cutting blades for movement relative to each other into a cutting position intersecting said plane at said cut-off location, the mounting means for said cutting blades providing a first motion component for advancing said cutting blades toward each other and a second motion component for displacing said cutting blades laterally and toward said cut-off location, sealing blades disposed in an inoperative position at opposite sides of and spaced from said plane and laterally offset from said cut-off location and from said cutting blades in the direction of said stock feeder, means mounting said sealing blades for movement relative to each other in trailing relation to said cutting blades into a sealing position at opposite sides of and contiguous to said plane at said cut-off location, the mounting means for said sealing blades providing a first motion component for advancing said sealing blades toward each other and a second motion component for displacing said sealing blades laterally and toward said cut-off location, and actuating means operable in timed relationship to said stock feeder for moving said cutting and sealing blades into said cutting and sealing positions respectively and in succession for first cutting said stock along a cut line at said cut-off location and then sealing said stock in an area compression bond bounded at one side by side cut line.

7. A machine according to claim 6 wherein said cutting blades have cutting faces which make a wiping contact with each other when said cutting blades move into said cutting position and including means for moving said cutting faces out of wiping contact after cutting of said tubular stock.

8. A machine according to claim 6 wherein said sealing blades have opposed sealing faces which compress said tubular stock when said sealing blades move into said sealing position and including means for limiting the approach of said sealing faces in said sealing position to provide a corresponding control over the compression of said tubular stock during sealing.

9. A machine for forming bags from thermoplastic tubular stock comprising a support, a stock feeder for advancing successive lengths of said stock in a cutting and sealing plane toward a cut-off location, cutting blades disposed in an inoperative position at opposite sides of and spaced from said plane and laterally offset from said cut-off location in the direction of said stock feeder, respective linkage means including opposed heads mounting said cutting blades for movement relative to each other into a cutting position intersecting said plane at said cut-off location, the mounting means for said cutting blades providing a first motion component for advancing said cutting blades longitudinally toward each other and a second motion component for displacing said cutting blades laterally and toward said cut-off location, sealing blades disposed in an inoperative position at opposite sides of and spaced from said plane and laterally offset from said cut-off location and from said cutting blades in the direction of said stock feeder, said opposed heads mounting said sealing blades for movement relative to each other in trailing relation to said cutting blades into a sealing position at opposed sides of and contiguous to said plane at said cut-off location, said linkage means providing a first component for advancing said sealing blades longitudinally toward each other and a second motion component for displacing said sealing blades laterally and toward said cut-off location, and actuating means operable in timed relationship to said stock feeder for moving said cutting and sealing blades into said cutting and sealing positions respectively and in succession for first cutting said stock along a cut line at said cut-off location and then sealing said stock in an area compression bond bounded at one side by said cut line.

10. A machine for forming bags from thermoplastic tubular stock comprising a support, a stock feeder for advancing successive lengths of said stock in a cutting and sealing plane toward a cut-off location, cutting blades disposed in an inoperative position at opposite sides of and spaced from said plane and laterally offset from said cut-off location in the direction of said stock feeder, a parallelogram linkage mounting said cutting blades for movement relative to each other into a cutting position intersecting said plane at said cut-off location, said linkage providing a first motion component for advancing said cutting blades longitudinally toward each other and a second motion component for displacing said cutting blades laterally and toward said cut-off location, sealing blades disposed in an inoperative position at opposite sides of and spaced from said plane and laterally offset from said cut-off location and from said cutting blades in the direction of said stock feeder, said cutting blades being mounted on said linkage for movement relative to each other in trailing relation to said cutting blades and into a sealing position at opposite sides of and contiguous to said plane at said cut-off location, said linkage providing a first motion component for advancing said sealing blades longitudinally toward each other and second motion component for displacing said sealing blades laterally and toward said cut-off location, and actuating means operable in timed relationship to said stock feeder for moving said cutting and sealing blades into said cutting and sealing positions respectively and in succession for first cutting said stock along a cut line at said cut-off location and then sealing said stock in an area compression bond bounded at one side by said cut line.

11. In a machine for the manufacture of bags from tubular thermoplastic stock wherein successive lengths of said stock are intermittently advanced to a cut-off location in a cutting and sealing plane, first and second heads disposed one above the other at opposite sides of said plane, a first pair of links pivotally mounted on said support at a first pair of pivotal mounts and pivotally connected to said first head at a first pair of pivotal connections and providing a first parallelogram linkage wherein said support intermediate said first pair of pivotal mounts serves as a first stationary link thereof and said first head intermediate said first pair of pivotal connections serves as a first movable link, a second head at a second pair of pivotal connections and providing a second parallelogram linkage wherein said support intermediate said second pair of pivotal mounts serves as a second stationary link thereof and said second head intermediate said second pair of pivotal connections serves as a second movable link, first cutting and sealing blades mounted on said first movable link with said first sealing blade being further spaced from said first stationary link and in trailing relation to said first cutting blade, and second cutting and sealing blades mounted on said second movable link with said second sealing blade being further spaced from said second stationary link and in trailing relation to said second cutting blades, said first and second cutting blades being disposed relative to each other to move into cutting contact as said cutting blades intersect said plane at said cut-off location in response to a first portion of the movement of said first and second movable links toward each other to cut successive lengths, said first and second sealing blades being disposed in opposed relation to each other to move in sealing contact confronting each other at said plane and substantially at said cut-off location in response to a further portion of the movement of said first and second movable links toward each other, said sealing blades being arranged to seal said stock substantially at said cut-off location such that an area compression bond is formed immediately contiguous to the cuts in successive lengths.

12. A machine for the manufacture of bags from tubular thermoplastic stock comprising a support, feeding rollers on said support for intermittently advancing successive lengths of said stock to a cut-off location, means for entraining successive lengths in multiple air jets to support said lengths in a horizontal cutting and sealing plane, first and second heads disposed one above the other at opposite sides of said plane, a first pair of links pivotally mounted on said support at a first pair of pivotal mounts and pivotally connected to said first head at a first pair of pivotal connections and providing a first parallelogram linkage wherein said support intermediate said first pair of pivotal mounts serves as a first stationary link thereof and said first head intermediate said first pair of pivotal connections serves as a first movable link, a second pair of links pivotal mounts and pivotally connected to said head at a second pair of pivotal connections and providing a second pair of pivotal mounts serves as a second stationary link thereof and said second head intermediate said second pair of pivotal connections serves as a second movable link, first cutting and sealing blades mounted on said first movable link with said first sealing blade being further spaced from said first stationary link and in trailing relation to said first cutting blade, second cutting and sealing blades mounted on said second movable link with said second sealing blade being further spaced from said second stationary link and in trailing relation to said second cutting blades, said first and second cutting blades being disposed relative to each other to move into cutting contact as said cutting blades intersect said plane at said cut-off location in response to a first portion of the movement of said first and second movable links toward each other to cut successive lengths, said first and second sealing blades being disposed in opposed relation to each other to move in sealing contact confronting each other at said cut-off location in response to a further portion of the movement of said first and second movable links toward each other, said sealing blades being arranged to seal said stock substantially at said cut-off location such that an area compression bond is formed immediately contiguous to the cuts in successive lengths, and actuating means operatively connected to said first and second linkage for moving said heads toward and away from each other in unison and in timed relation to the intermittent advance of said tubular stock.

References Cited by the Examiner

UNITED STATES PATENTS

| | | | |
|---|---|---|---|
| 2,641,304 | 6/53 | Biddinger et al. | 156—583 |
| 2,759,090 | 8/56 | Frye | 156—515 |
| 2,800,163 | 7/57 | Rusch | 156—269 |
| 2,925,119 | 2/60 | Jaquiery | 156—510 |
| 3,008,865 | 11/61 | Hayes et al. | 156—510 |

EARL M. BERGERT, *Primary Examiner.*